US008666997B2

(12) United States Patent
Kwiatkowski et al.

(10) Patent No.: US 8,666,997 B2
(45) Date of Patent: *Mar. 4, 2014

(54) PLACEHOLDERS RETURNED FOR DATA REPRESENTATION ITEMS

(75) Inventors: Paul J. Kwiatkowski, Redmond, WA (US); Shawn A. Van Ness, Renton, WA (US); Nicolas Brun, Seattle, WA (US); Michael A. Nelte, Redmond, WA (US); Arpit S. Shah, Bellevue, WA (US); Paul A. Gusmorino, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/962,662

(22) Filed: Dec. 8, 2010

(65) Prior Publication Data

US 2012/0150886 A1    Jun. 14, 2012

(51) Int. Cl.
*G06F 17/30* (2006.01)

(52) U.S. Cl.
USPC .......................................................... 707/758

(58) Field of Classification Search
USPC .......................................................... 707/758
See application file for complete search history.

(56) References Cited

U.S. PATENT DOCUMENTS

| 5,864,850 | A | 1/1999 | Nordman |
| 6,260,125 | B1 | 7/2001 | McDowell |
| 7,200,666 | B1 | 4/2007 | Nguyen |
| 7,480,654 | B2 | 1/2009 | Jujjuri et al. |
| 7,725,456 | B2 | 5/2010 | Augustine |
| 7,761,522 | B2 | 7/2010 | Shenfield et al. |
| 7,890,464 | B2 | 2/2011 | Reinsch |
| 2001/0049635 | A1 | 12/2001 | Chung |
| 2003/0131051 | A1 | 7/2003 | Lection et al. |
| 2003/0131073 | A1* | 7/2003 | Lucovsky et al. ............. 709/219 |
| 2004/0172423 | A1 | 9/2004 | Kaasten et al. |
| 2004/0205692 | A1 | 10/2004 | Robinson |
| 2004/0230903 | A1 | 11/2004 | Elza et al. |
| 2004/0267836 | A1 | 12/2004 | Armangau et al. |

(Continued)

FOREIGN PATENT DOCUMENTS

JP          2002259189 A      9/2002

OTHER PUBLICATIONS

"Conventions for Bound Properties", Retrieved at << http://opensource.adobe.com/wiki/display/flexsdk/Conventions+for+Bound+Properties >>, Feb. 5, 2009, pp. 5.

(Continued)

*Primary Examiner* — Amresh Singh
(74) *Attorney, Agent, or Firm* — Carole Boelitz; Micky Minhas (57) ABSTRACT

One or more requests from a client for data representation items can be received by an items manager. The data representation items can represent data items in a data source. In response, the items manager can perform the following: generating placeholders corresponding to the data representation items; returning the placeholders to the client; fetching the data items from the data source; providing the data representation items to the client; and informing the client that the placeholders are to be replaced with the data representation items. The items manager may determine whether each data representation item can be synchronously returned to the client. If so, the items manager may return that data representation item synchronously, and may forego providing the client with a placeholder for that data representation item. This may allow a client to interact with a single interface for both synchronous and asynchronous data sources.

20 Claims, 6 Drawing Sheets

(56) References Cited

U.S. PATENT DOCUMENTS

| | | |
|---|---|---|
| 2005/0038791 A1 | 2/2005 | Ven |
| 2005/0055354 A1 | 3/2005 | Thompson et al. |
| 2005/0154847 A1 | 7/2005 | Trembecki |
| 2005/0216441 A1 | 9/2005 | Thomas et al. |
| 2005/0234997 A1 | 10/2005 | Gu et al. |
| 2006/0064634 A1 | 3/2006 | Dettinger et al. |
| 2006/0101082 A1 | 5/2006 | Agrawal et al. |
| 2006/0106888 A1 | 5/2006 | Iida et al. |
| 2007/0198602 A1 | 8/2007 | Ngo et al. |
| 2007/0208786 A1 | 9/2007 | Kim |
| 2007/0288531 A1 | 12/2007 | Motta |
| 2008/0016151 A1 | 1/2008 | Howard et al. |
| 2008/0134211 A1 | 6/2008 | Cui |
| 2008/0140587 A1 | 6/2008 | Corning et al. |
| 2008/0270486 A1 | 10/2008 | Hind et al. |
| 2009/0132956 A1 | 5/2009 | Mahasintunan |
| 2009/0164921 A1 | 6/2009 | Wagner et al. |
| 2009/0259695 A1 | 10/2009 | Gupta et al. |
| 2009/0279143 A1* | 11/2009 | St. Jacques et al. ......... 358/3.28 |
| 2009/0327403 A1 | 12/2009 | Bhat et al. |
| 2010/0229052 A1 | 9/2010 | Cuneo et al. |
| 2011/0055155 A1 | 3/2011 | Page et al. |
| 2012/0054158 A1 | 3/2012 | Hu et al. |

OTHER PUBLICATIONS

"Flexible and Powerful Data Binding with WPF", Retrieved at << http://www.devx.com/codemag/Article/40316/1763/page/3 >>, Retrieved Date : Oct. 5, 2010, pp. 3.

Chawathe, et al., "Representing and Querying Changes in Semistructured Data", Retrieved at << http://ieeexplore.ieee.org/stamp/stamp.jsp?tp=&arnumber=655752 >>, Feb. 27, 1998, pp. 10.

"Data Replication for Backup Best Practices", Retrieved at << http://searchdatabackup.techtarget.com/generic/0,295582,sid187_gci1349280,00.html >>, Mar. 2, 2009, pp. 3.

Hsiao, et al., "Tornado: A Capability-Aware Peer-to-Peer Storage Network", Retrieved at << http://urania.cs.ntou.edu.tw/~william/20071220/Tapestry/01213171.pdf >>, Proceedings of the International Parellel and Distributed Processing Symposium, Apr. 26, 2003, pp. 8.

Jansen, et al., "Data Locality in Parallel Rendering",Retrieved at << http://graphics.tudelft.nl/~fwj/PGV98.pdf >>, 1998, pp. 15.

"Data Binding Overview", Retrieved at << http://msdn.microsoft.com/en-us/library/ms752347.aspx >>, Retrieved Date: Oct. 5, 2010, pp. 13.

Preguica , et al., "Integrating Synchronous and Asynchronous Interactions in Groupware Applications",Retrieved at << http://citeseerx.ist.psu.edu/viewdoc/download?doi=10.1.1.64.6145&rep=rep1&type=pdf >>, Proceedings of CRIWG, Sep. 2005, pp. 16.

Tretola, et al., "Extending Web Services Semantics to Support Asynchronous Invocations and Continuation", Retrieved at << http://ieeexplore.ieee.org/stamp/stamp.jsp?tp=&arnumber=4279601>>, IEEE International Conference on Web Services, Jul. 9, 2007, pp. 8.

"Configuring High Availability for Oracle Fusion Middleware SOA Suite",Retrieved at << http://download.oracle.com/docs/cd/E16764_01/core.1111/e10106/ha_soa.htm >>, Retrieved Date: Oct. 7, 2010, pp. 123.

Costa, et al., "TeenyLIME: Transiently Shared Tuple Space Middleware for Wireless Sensor Networks", Retrieved at << http://www.sics.se/~luca/papers/costa06teenylime.pdf >>, Proceedings of the international workshop on Middleware for sensor networks, 7th International Middleware Conference Nov. 27-Dec. 1, 2006, pp. 6.

"MIRO Announces GOLD™ Version 2005", Retrieved at << http://www.mirotechnologies.com/news-and-events-detail.php?sec=6&sub=34&sub1=161 >>, Dec. 21, 2004, pp. 4.

Office Action, U.S. Appl. No. 12/962,660, filed Dec. 8, 2010, Mailing Date: Nov. 13, 2012, pp. 16.

Office Action, U.S. Appl. No. 13/010,779, filed Jan. 21, 2011, Mailing Date: Nov. 15, 2012, pp. 24.

Office Action, U.S. Appl. No. 12/962,662, filed Dec. 8, 2010, Mailing Date: May 11, 2012, pp. 21.

"International Search Report", Mailed Date: Jul. 18, 2012, Application No. PCT/US2011/063209, Filed Date: Dec. 4, 2011, pp. 9.

Office Action, U.S. Appl. No. 12/962,660, Filed Dec. 8, 2010, Mailing Date: May 11, 2012, pp. 21.

Office Action, U.S. Appl. No. 12/962,660, Filed Dec. 8, 2010, Notification Date: May 7, 2013, pp. 14.

Office Action, U.S. Appl. No. 13/010,779, Filed Jan. 21, 2011, Notification Date: Apr. 26, 2013, pp. 27.

Office Action, U.S. Appl. No. 13/111,951, Filed May 20, 2011, Notification Date: Apr. 15, 2013, pp. 32.

Office Action, U.S. Appl. No. 12/962,660, Filed Dec. 8, 2010, Notification Date: Oct. 9, 2013, pp. 14.

Office Action, U.S. Appl. No. 13/111,951, Filed May 20, 2011, Notification Date: Sep. 27, 2013, pp. 20.

Gast, Holger, "Managing Proof Documents for Asynchronous Processing", Retrieved at <<http://www-pu.informatik.uni-tuebingen.de/users/gast/files/asyncdoc.pdf>>, Sep. 29, 2008, pp. 15.

Seidenberg, et al., "A Methodology for Asynchronous MultiUser Editing of Semantic Web Ontologies", Retrieved at <<http://www.deltaflow.com/wp-content/pdf/kcapfp10-seidenberg.pdf>>, Oct. 28-31, 2007, pp. 8.

Ignat, et al., "Operation-Based Versus State-Based Merging in Asynchronous Graphical Collaborative Editing", Retrieved at <<http://www.loria.fr/~ignatcla/pmwiki/pub/papers/IgnatCEW04.pdf>>, Retrieved Date: Jan. 24, 2011, pp. 8.

Kwiatkowski, et al., "Change Notifications From an Updated Data Representation", U.S. Appl. No. 12/962,660, filed Dec. 8, 2010, pp. 37.

Kwiatkowski, et al., "Data Items Manager", U.S. Appl. No. 13/010,779, filed Jan. 21, 2011, pp. 60.

Kwiatkowski, et al., "Optimistic Application of Data Edits", U.S. Appl. No. 13/111,951, filed May 20, 2011, pp. 48.

* cited by examiner

PLACEHOLDERS RETURNED FOR DATA REPRESENTATION ITEMS

BACKGROUND

Software applications and software components such as user interface controls (i.e., independent reusable user interface components) can act as clients of data sources, which may include local data sources or remote data sources that are reached over a computer network. Some data sources, such as local data sources, can respond synchronously to requests for data. In other words, such responses to data requests take less time than some response time threshold, which is typically low enough that a presentation of the response can appear to be in real time with the corresponding request. For example, such responses may take on the order of tens of milliseconds or less. Other data sources, such as remote data sources, may respond asynchronously. In other words, responses to data requests take more time than the response time threshold discussed above.

SUMMARY

According to the tools and techniques described herein, a module called an items manager can return placeholders to a client of a data source in lieu of returning requested data representation items, at least in some situations. When the requested data representation items become available, the items manager can inform the client that the placeholders are to be replaced with the data representation items. This may provide one or more of various benefits, such as allowing a client to interact with a single interface that may be used for both synchronous and asynchronous data sources. As used herein, a placeholder is an object that is returned to the client in lieu of a requested data representation item. A placeholder can take any of various forms. For example, the placeholder(s) and the actual data representation items in a cache maintained by the items manager may be in the form of rendered user interface elements. Alternatively, the placeholders and/or data representation items may take some other form, such as the form of opaque handles, or some other data type. Additionally, placeholders in a local data representation used by the items manager may be in a different form from the placeholders returned to the client in response to requests from the client. As used herein, a data item is an item provided by a data source. The data item may be the same format as or a different format from a format in which a corresponding data item is stored in the data source. A data representation item is a representation of a data item, and a data representation item may be in the same format as or a different format from a data item that is being represented by the data representation item.

In one embodiment, the tools and techniques can include an items manager receiving a set of one or more requests from a client for multiple data representation items. The data representation items can represent data items in a data source. The items manager can respond to the request(s) by performing acts for the data representation items. The acts can include the following: generating placeholders corresponding to the data representation items; returning the placeholders to the client in response to the request(s); requesting the data items from the data source; receiving the data items back from the data source; providing the data representation items to the client; and informing the client that the placeholders are to be replaced with the data representation items.

In another embodiment of the tools and techniques, a set of one or more requests from a client for multiple data representation items can be received by an items manager. The data representation items can represent data items in a data source. The items manager can respond to the request(s) by performing acts for each of the data representation items. These acts can include determining whether the data representation item is available to be synchronously returned to the client in response to the set of one or more requests. If the items manager determines that the data representation item is available to be synchronously returned to the client, then the acts can include synchronously returning the data representation item to the client. If the items manager determines that the data representation item is not available to be synchronously returned to the client (e.g., because the data source can return the data item represented by the data representation item to the items manager synchronously, and/or because the items manager has cached the data representation item), then the acts can include the following for that data representation item: generating a placeholder corresponding to the data representation item; returning the placeholder to the client; fetching a data item that is represented by the data representation item from the data source; providing the data representation item to the client; and informing the client that the placeholder is to be replaced with the data representation item.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

The tools and techniques described herein may be beneficial in handling issues presented by synchronous and/or asynchronous responses to requests for data. Embodiments described herein are directed to techniques and tools for improved interaction between a data source and its client via an items manager. Such improvements may result from the use of various techniques and tools separately or in combination.

The items manager is a module that can perform various operations, such as relaying requests and responses for data representation items and data items represented by those data representation items between the client and data source, and generating (possibly using one or more renderers) and returning placeholders to the client. The items manager may also change formats between the data items received from the data source and data representation items provided to the client. For example, the items manager may use one or more renderers to generate rendered data representation items. The items manager may be written or configured in various ways. For example, code for the items manager may be written in a scripting language, such as in an ECMAScript text file. Alternatively, the code for the items manager may be in some other format, such as in a dynamically linked library, or the items manager could be incorporated more closely into an application itself, such as in a static library.

The items manager may be a re-usable module. The term re-usable refers to the items manager being a module that can be plugged into various different environments to interact with a client and a data source. In such different environments, the client and/or data source may be configured differently, but the items manager is still able to provide an interface for the client and the data manager. For example, the items manager may be included in code for a client application, the items manager may be a separate component from the client but be running in the same process as the client, the items manager may be included in an environment where it runs in a separate process from the corresponding client, etc.

The items manager can present to a client an interface that behaves as if the data source supports synchronous interaction, whether or not the data source actually does. When a data representation item is requested, if the data representation item is not available for a synchronous response, a placeholder can be returned instead. For example, the placeholder may be returned synchronously. When the data item represented by the data representation item is finally fetched, the items manager can notify the client that the placeholder is to be replaced with the data representation item. Such use of placeholders may provide one or more of various benefits. For example, the tools and techniques may allow the client to interact with the items manager as if the client were dealing with a data source providing synchronous responses, whether or not the data source actually is providing such synchronous responses. The items manager may include additional features and operations to improve performance. Some of these features and operations will be discussed in the following paragraphs.

The items manager may operate in conjunction with one or more renderers. A renderer is a function that accepts some data and returns a generated user interface element. For example, in one implementation, the data is in the form of an ECMAScript object such as a JSON (JavaScript Object Notation)-serializable ECMAScript object and a string that serves as a key for the item. Each such key can be a value that does not change for the data item, and that is different from keys for the other data items in the data set in the data source. For example, the keys may be keys made up by the data source for recordkeeping, or they may be identifiers such as driver's license numbers, social security numbers, etc. To the extent such keys represent sensitive information, they can be protected with appropriate security measures such as encryption techniques. The keys can be used by the items manager for recordkeeping, such as distinguishing and/or matching corresponding data items and/or data representation items. The user interface element can be in one of various forms, such as the form of a HTML Document Object Model (DOM) object, which may be, for example, HTML text or the root of a DOM element sub-tree. A client may provide two renderers—one that renders actual data representation items and one that can be used before the data is available (it may be passed an index parameter, or no parameters) to generate an empty placeholder. The renderers can allow the items manager and client to use user interface elements as the placeholders. Such use of user interface elements can simplify the tracking of placeholder identities for the client and the items manager. For example, the client can track the identity of placeholders without much effort, replacing one user interface element (the placeholder) with another (the data representation item) when the client is told to do so by the items manager.

The items manager may also determine whether a data source is responding synchronously. If a data source is responding asynchronously, then the items manager can return placeholders, as discussed herein. However, if the data source is responding synchronously, then the items manager can return requested data representation items without returning placeholders. This can improve performance when synchronous responses are provided, such as by avoiding flicker that can be present if the client were to display the placeholder and then immediately display the data representation item on the same display area.

The items manager may batch together multiple requests for data received from the client. However, the items manager can also take steps to attempt to avoid sending redundant requests for the same data. For example, the items manager may take steps to avoid send a request for "Item 20 and its 10 successors", followed immediately by a request for "Item 21 and its 10 successors" before the first request has had a chance to complete.

The items manager may allow a data source to return more (or fewer) items than were requested by the items manager. Additionally, the items manager may request more items than were requested by the client. The additional data items received in such responses from the data source can be cached by the items manager as data representation items (which may be in the same form as or a different form from the data items fetched from the data source and/or the data representation items provided to the client) and used to synchronously respond to future requests from the client for those items with the actual data representation items from the cache (again, avoiding creation of some placeholders).

In some situations, the items manager may return some placeholders to the client "speculatively" before knowing if the data source includes corresponding data for those placeholders. For example, the items manager may return placeholders when it is not known if the edge of a dataset at the data source has been reached. The items manager may subsequently instruct the client to delete such extra placeholders that do not ultimately correspond to actual data items. The items manager may also inform the client that the placeholders are "mirages" (i.e., placeholders that, as far as the items manager determines, do not—and never did—correspond to actual data items). The returning and deletion of speculative placeholders can allow the items manager to return placeholders without waiting to find out if there are actual corresponding data items to be returned from the data source. Additionally, labeling placeholders as mirages may allow the client to treat such placeholders differently when the placeholders are being deleted (e.g., fading them out on a display instead of abruptly removing them from the display).

Accordingly, one or more substantial benefits can be realized from the tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
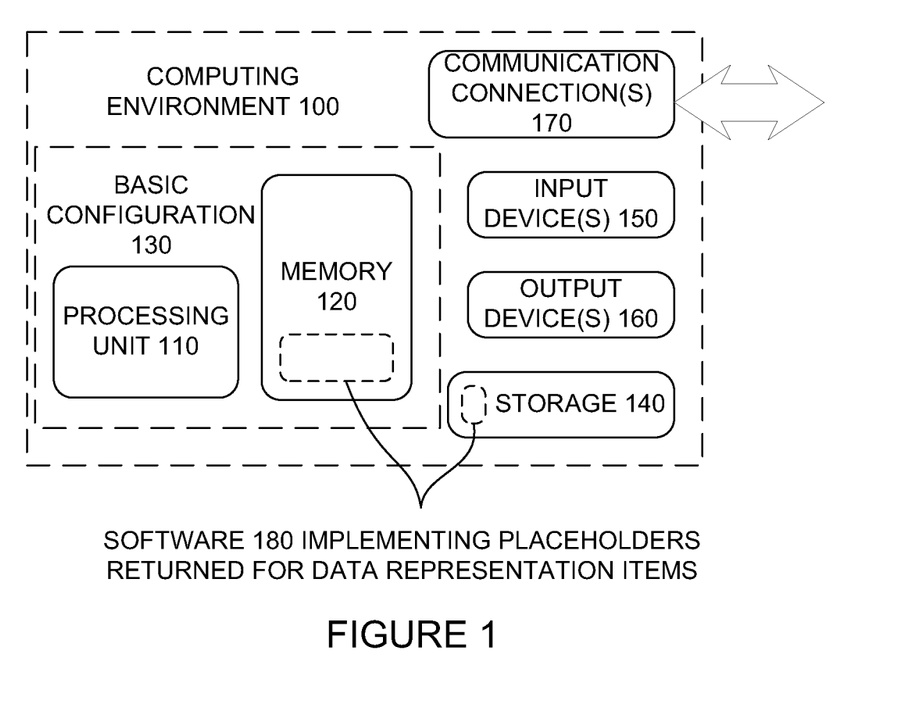
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as an environment for a client, items manager, and/or data source. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing placeholders returned for data representation items.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available non-transitory storage media that can be accessed within a computing environment. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. System and Environment for Returning Placeholders for Data Representation Items

A. The General Environment and Operation of the Items Manager

Figure 2:
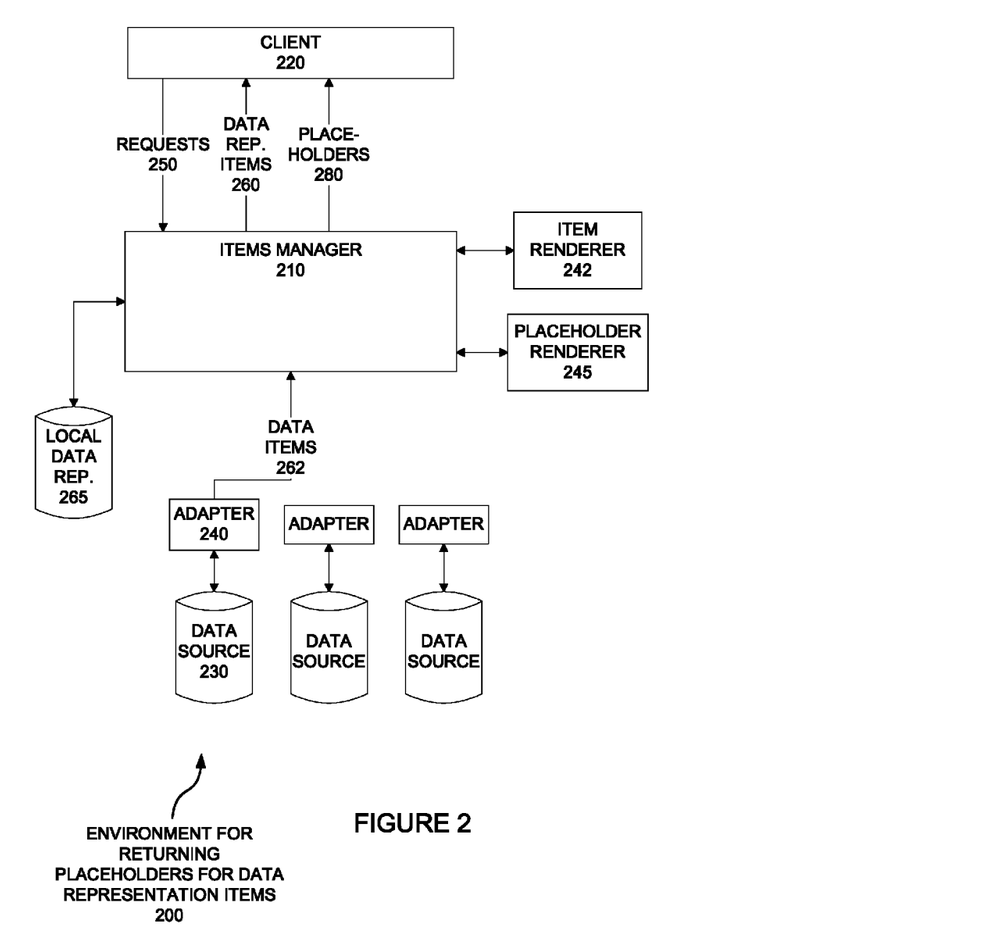
FIG. 2 is schematic diagram of an environment for returning placeholders for data representation items.

FIG. 2 is a schematic diagram of an environment (200) for returning placeholders for data representation items, in conjunction with which one or more of the described embodiments may be implemented. The environment (200) can include an items manager (210), which can be a module such as a software component. The items manager (210) can communicate with a client (220) and with a data source (230), which can be one of various different types of data sources (illustrated by the other data sources in FIG. 2). The items manager (210) may communicate with the data source (230) through an adapter (240), which can be configured for a particular type of data source. The items manager (210) may also communicate with an item renderer (242) and a placeholder renderer (245) if the items manager (210) is to send rendered versions of data representation items to the client (220). The various components shown in FIG. 2 may be in a single computing environment such as the computing environment (100) discussed above, or they may be spread across multiple computing environments in one of various different configurations.

The items manager (210) can receive one or more requests (250) from the client (220) for representation item(s) representing one or more items from the data source (230). In response, the items manager (210) can fetch the data representation items (260) by fetching data items (262) from the data source (230) through the adapter (240) or from a local data representation (265) (if data items (262) for the requested data representation items (260) have already been received from the data source (230)). For example, the items manager (210) can send one or more requests to the data source (230), and the data source (230) can return data items (262) to the items manager (210) through the adapter (240). The data items (262) may change form as they are sent from the data source (230) as data items (262) and ultimately received by the client (220) as data representation items (260). As just one example, the adapter (240) may convert the data items (260) to an array of ECMAScript objects and forward those objects to the items manager (210) as data items (262). The items manager (210) may send the ECMAScript objects to the item renderer (242), and the item renderer may return the data representation items (260) to the items manager as DOM elements, and the items manager (210) may forward those DOM elements to the client (220). The data representation items (260) may take any of various other forms. For example, the items manager (210) may send un-rendered versions of the data representation items (260) to the client (220), and the client (220) may use the data representation items (260) for uses other than display.

The items manager (210) may maintain the local data representation (265) that represents a subset of a larger data set maintained by the data source (230). For example, the local data representation (265) may only include data representation items (260) for items that are currently displayed in a list (which could be displayed in various forms, such as in a vertically-extending list, in a grid, as thumbnails, etc.) by the client (220) and possibly some related data representation items (260). For example, the local data representation (265) may also include data representation items (260) for neighbors of items that are currently displayed, items that have recently been displayed, etc. However, the items manager (210) may virtualize the local data representation (265) to make it seem to the client (220) as though the items manager (210) has downloaded the entire data set from the data source (230). This virtualization can allow a client to enumerate a list of data representation items (260) as if the entire list of represented data items (262) in the data set had been fetched from the data source (230), even though only a portion of the data set has been fetched. For example, this may include the items manager (210) fetching and providing the client (220) with information on a total number of items in the data set of the data source (230) so that the client (220) can take appropriate actions, such as sizing and locating a scroll bar appropriately for a list representing the overall data set of the data source (230).

B. Returning Placeholders for Data Representation Items

If the client (220) sends the items manager (210) a request (250) for an item representation that the items manager (210) has not yet retrieved from the data source (230), the items manager (210) can return to the client (220) a placeholder (280) until the items manager (210) successfully fetches the corresponding data item (262) from the data source (230). The items manager (210) may also include the placeholder (280) in the local data representation (265), where the placeholder (280) can be used for recordkeeping purposes, such as to be matched with a corresponding data representation item (260) when the corresponding data item (262) is returned from the data source (230). Additionally, the client (220) may use the placeholder for various purposes such as recordkeeping and for displaying in lieu of the actual data representation item (260) until the data representation item (260) is returned.

In one implementation, the items manager (210) can expose to the client (220) an interface that allows individual data representation items (260) to be fetched in various ways in response to different types of requests (250) from the client (220). For example, a request (250) may be in the form of a call to a method, such as one of the following: "firstItem" (a method for returning the item with the lowest index number), "lastItem" (a method for returning the item with the highest index number), "nextItem" (a method for returning the item with the next highest index number from a specified item), "prevItem" (a method for returning the item with the next lowest index number from a specified item), "itemAtIndex" (a method for returning an item with a specified index number), or "itemFromDescription" (a method for returning an item with a specified domain-specific description). In response to calls to each of these request methods, the items manager (210) can return the requested data representation items (260) as user interface elements generated by the item renderer (242).

When one of these item request methods is called, the items manager (210) can first check to determine whether the items manager (210) already has the data for the given item cached in the local data representation (265), which may be in memory. If so, the items manager (210) might have already called the item renderer (242), in which case the items manager (210) can return the same user interface element again as the data representation item (260), or else the items manager (210) can call the item renderer (242) immediately and return the instantiated (e.g., rendered as a UI description that can be sent to the client) item to the client (220) as the data representation item (260).

Otherwise, the items manager (210) can call an appropriate method on the adapter (240), passing the adapter (240) a callback function that the adapter (240) can synchronously or asynchronously call to return the requested data items (262). The data source (230) may be capable of returning data items (262) quickly (such as where the data source (230) is a local data source) so that the adapter (240) can report the resulting data items (262) synchronously by calling back into the items manager (210) immediately (i.e., by calling the callback function synchronously).

The items manager (210) can detect when such a synchronous callback has happened. For example, the callback the items manager (210) passes to the adapter can store the data representation item (260) in a slot data structure created for the item. The items manager (210) can execute a calling function to call into the adapter. After executing the calling function, the items manager (210) may inspect the slot data structure to see if the data representation item (260) has been stored there. If it has not, then the items manager (210) can know the request will be completed asynchronously, and a placeholder (280) can be created. This determination may be made again with each request for items, or it may be made just once or only periodically with a particular data source (230). Alternatively, the adapter (240) and/or the data source (230) may inform the items manager (210) whether the data source (230) is able to return items synchronously. Such overall determinations for a data source (230) or a group of data items (262) may be considered a determination for each data item (262) to which the determination applies.

If the callback function has been called back synchronously, the items manager (210) can call the item renderer (242) and return the instantiated item to the client (220) as a data representation item (260). This can be done without generating or providing a placeholder (280).

If the items manager (210) has not already received the requested data items (262), and the requested data items will not be returned synchronously, then an asynchronous call may be used to fetch the data items (262). To avoid redundant calls for the same data items (262), when a data fetch is initiated, an identifier for that fetch can be generated and added to a hash table. Placeholders (280) for data items (262) that are expected to be returned by the particular fetch can be added to slots in the local data representation (265) and labeled with this fetch identifier. When the fetch completes, whether it succeeded or failed, its identifier can be removed from the hash table.

Accordingly, there may be at least three sub-cases when a client (220) requests an as-yet-uninstantiated data representation item (260) from a data source (230) that is returning corresponding data items (262) asynchronously. First, the client (220) may have already requested the data representation item (260), in which case a placeholder (280) may already exist for the item, and that placeholder (280) can be returned. Second, the client (220) can be requesting a data representation item (260) for the first time, and the request (250) from the client (220) can initiate an asynchronous request to the data source (230); a new placeholder (280) can also be generated and returned. Third, a client (220) can be requesting a data representation item (260) for the first time, but the request (250) may be such that it a corresponding request is not to be sent to the data source (230) until an earlier request to the data source (230) is fulfilled (e.g. the items manager (210) will be fetching the corresponding data items (262) after a given item, but that item is itself still only a placeholder (280)); a new placeholder (280) can be created and returned, and initiation of a fetch can wait until an appropriate time.

When data items (262) arrive from the data source (230), the items manager (210) can match the data items (262) to placeholders and call the item renderer (242) for any data items (262) that can now be instantiated. For each instantiation, the items manager (210) can send an "item available" notification to the client (220), passing to the client (220) references to an existing user interface element (the placeholder (280)) and a replacement user interface element (the data representation item (260)). The client (220) can respond by replacing the placeholder (280) with the data representation item (260). This replacement can result in the client (220) replacing a presentation (e.g., a display) of the placeholder (280) with a presentation (e.g., a display) of the data representation item (260). The items manager (210) can also check for placeholders (280) adjacent to the results received back from the data source (230), and can initiate new fetches for corresponding data items (262) if those items have not already been requested.

The items manager (210) can attempt to reduce the number of network round-trips to the data source (230), so the items manager (210) can count adjacent placeholders (280) and request data items (262) in batches. Accordingly, one request from the items manager (210) may be requesting data items (262) that were requested in multiple requests from the client (220). If a set of data items (262) received back from the data source (230) extend beyond the current set of placeholders (280), the extra data items (262) can be stored in slots in the local data representation (265) so that some future requests may be fulfilled synchronously with data representation items (260) representing those cached data items (262).

A data source (230) may be allowed to return more or fewer items than the items manager (210) requests. The approach described above can allow for this, although it is possible that some unnecessary fetches may be initiated by the items manager (210). To reduce this possibility, the items manager (210) may generally wait for data items (262) from one request to be returned before making the next request. This may also allow more of the data items (262) to be requested by their keys, rather than in other ways, such as solely by index. For example, the items manager (210) may wait in this manner as long as the requests are for adjacent data items (262) (with "adjacent" being determined by index values). In which case, for example, if the items manager (210) received a data item (262) with a key of "A", the items manager (210) may then request the data item with a key of "A" (to provide some overlap in the requests for, e.g., detecting whether changes have been made to the data in the data source (230) between requests) and the next 10 items. But the items manager (210) may opt not to wait if one request and the next request after it are requesting data items (262) that are not adjacent to each other—because then the response to the first request would be unlikely to include data items (262) to be requested in the next request.

In some scenarios, the client (220) and the items manager (210) may not know the total number of data items in the dataset at the data source (230). Rather than require an end user to wait for a network round trip to determine the extents of the data before displaying any placeholders (280), the items manager can return placeholders (280) "speculatively". In other words, the items manager (210) can return such placeholders (280), speculating that the number of items in the dataset at the data source (230) is larger than what the client (220) will request before a count has been established. In the event that this speculation turns out to be wrong, some placeholders (280) may be removed because they do not actually correspond to data items (262). The items manager (210) can send the client (220) the same "removed" notification the items manager (210) would send if an item were actually deleted from the dataset. However, to give the client (220) the option of displaying a distinct animation for this situation (e.g. a subtle fade-out rather than a dramatic flyaway effect), an additional Boolean parameter (e.g., a parameter named "mirage") may be passed with the notification. Such a mirage parameter may indicate to the client (220) that as far as the items manager (210) has determined, there was not a data item (262) corresponding to the associated placeholder (280). This mirage Boolean may be useful in other circumstances, such as when two non-contiguous regions of the data items (262) have been instantiated as data representation items (260) and expanded until the regions "collide", but too many placeholders (280) have been created between the regions.

By combining the placeholder features of the items manager (210) with the data templating features of the placeholder renderer (245) and the item renderer (242), a programming interface between the client (220) and the items manager (210) can be simplified because the client (220) and items manager (210) can operate without separate handles to track identity. Instead, the items manager (210) can pass the client (220) a reference to the placeholder (280) and a reference to the requested data representation item (260), instructing the client (220) to replace the placeholder (280) with the data representation item (260) (e.g., with an "item available" notification). A client (220) can unconditionally insert the values (data representation items (260) and/or placeholders (280)) returned by calling one of the request methods (firstItem, etc.) at the appropriate location in the user interface data structure (e.g., a DOM tree) of the client (220), and later swap out any placeholders (280) when notified to do so by the items manager (210). Thus, the client (220) can interact with the items manager (210) as if the client (220) were interacting with a synchronous data source, whether or not the actual data source (230) can provide synchronous responses to data requests.

In an alternate design, the items manager (210) (rather than the client (220)) could maintain a user interface data structure. For example, where the user interface data structure is a DOM tree, the client (220) could receive a data representation item (260) as a DOM element and could assume that the DOM element has children corresponding to the items in a complete list beneath that DOM element. The client (220) could use the items manager (210) instead of a DOM interface to navigate from one child to the next. The items manager (210) could include placeholders (280) and replace them with data representation items (260) in the DOM tree itself. In this manner, the items manager (210) could navigate back and forth along the children, and could update the children with placeholders (280) and later with data representation items (260) when the data representation items (260) become available. The environment (200) could also include one or more data structures for recordkeeping, such as data structures to track one or more locations in a list of the data representation items (260).

C. Example of Returning Placeholders for Data Representation Items

Following is a description of an implementation of a technique that the items manager (210) can use to update the local data representation (265) to keep track of placeholders (280) and data representation items (260) as requests (250), as data items (262) are received by the items manager (210). Overall, this technique can include inserting placeholders (280) into slots in the local data representation (265), and replacing the placeholders (280) with corresponding data representation items (260) in the slots as corresponding data items (262) are received and matched with associated placeholders (280) (e.g., by the data representation having a matching index number, having one or more matching neighbors, etc.). This technique will be described with reference to FIG. 3, which illustrates a specific example of a portion of an original local data representation (310), a portion of received data (320) that was fetched in response to a request from the items manager, a resulting portion of an updated local data representation (330) after placeholders in the original local data representation (310) are replaced with data representation items, and a portion of a further updated local data representation (340).

Figure 3:
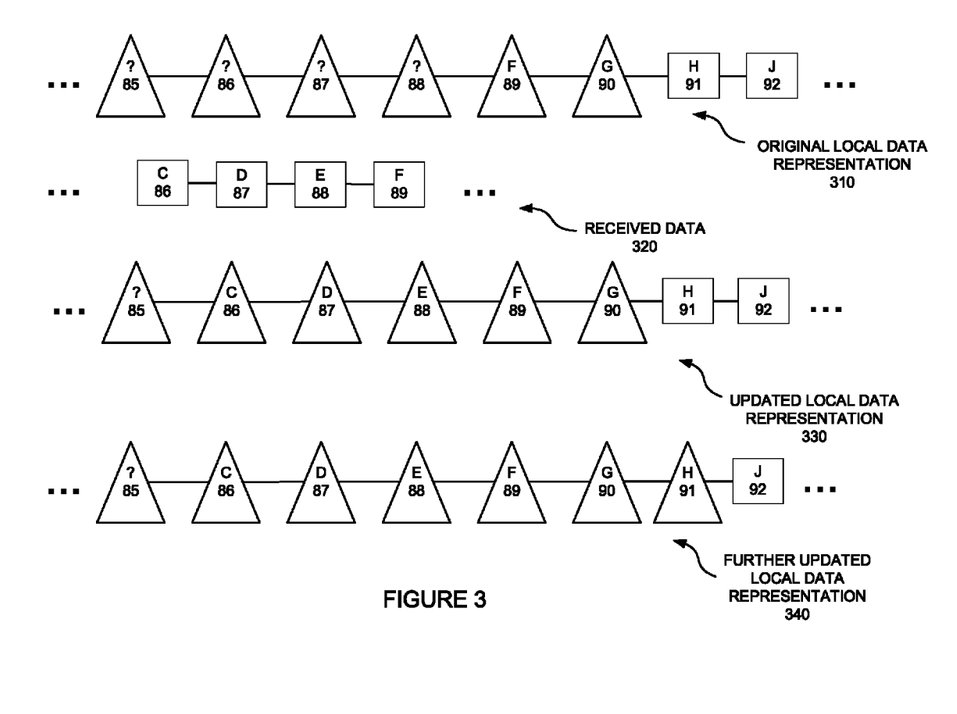
FIG. 3 is a schematic diagram of a portion of a local data representation as it is modified in response to client requests and received data items.

In FIG. 3, items are listed in the order of their indices, which may or may not be their actual order in the local data representation. In FIG. 3, triangles with question marks illustrate placeholders, triangles with capital letters illustrate data representation items that have been requested by the client and instantiated, and boxes with letters illustrate data items that have been returned from the data source but not requested by the client and not yet instantiated. The numbers below the question marks or capital letters indicate the index numbers for the items in the overall data set in the data source. Additionally, the capital letters can represent keys for the data items and for corresponding data representation items.

The original local data representation (310) illustrates an example of the local data representation while a fetch is in progress. The original local data representation (310) is illustrated as including four placeholders with indices 85, 86, 87, and 88 (representing items that had been requested by the client but not yet returned by the items manager), followed by instantiated data representation items F and G with respective indices 89 and 90, and then followed by unrequested (i.e., not yet requested by the client) data items H and J, with respective indices 91 and 92. This illustration of the original local data representation (310) indicates that the client has requested six items so far, but only F and G have arrived, along with the unrequested items H and J.

The received data (320) illustrates more data items that have arrived, including items C, D, E, and F with respective indices 86, 87, 88, and 89.

The items in the received data (320) can be rendered and matched with placeholders in the original local data representation (310), and can replace those placeholders in the local data representation and at the client. This can produce the updated local data representation (330), which illustrates the local data representation after the received items C, D, and E have been rendered and included in slots in the local data representation.

Another fetch may be initiated, such as for C and its immediate predecessor. Additionally, the client can request G's successor. In response, H can be instantiated and provided to the client synchronously, with associated changes being made in the local data representation, yielding the further updated local data representation (340).

III. Techniques for Returning Placeholders for Data Representation Items

Several techniques for returning placeholders for data representation items will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 4:
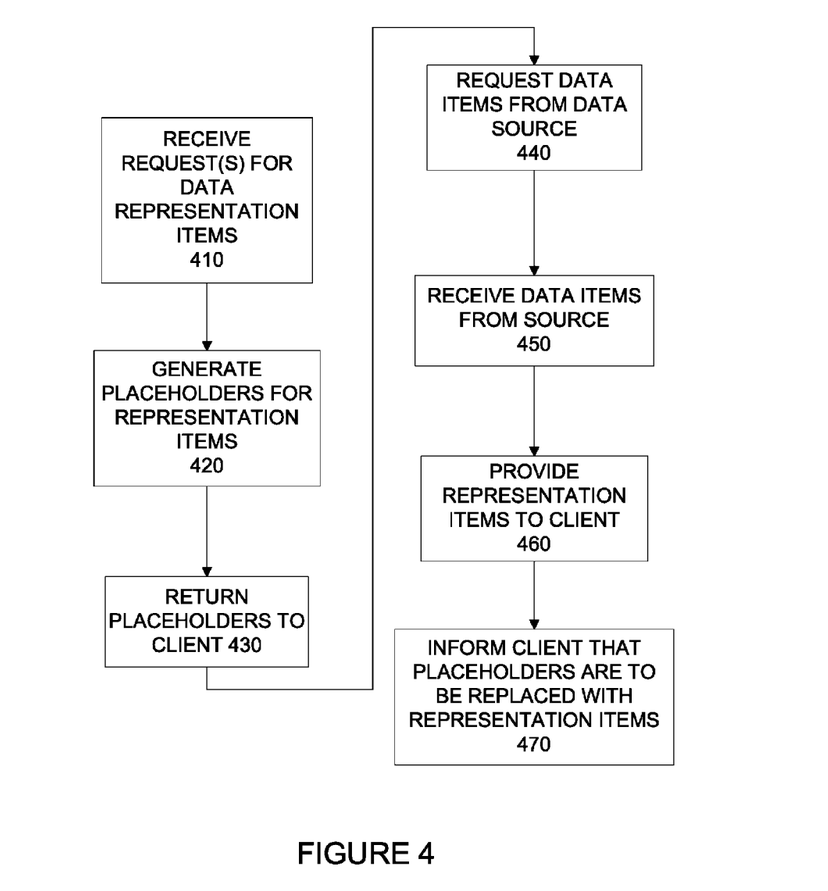
FIG. 4 is a flowchart of a technique for returning placeholders for data representation items.

Referring to FIG. 4, a technique for returning placeholders for data representation items will be described. The technique can include an items manager receiving (410) a set of one or more requests from a client for multiple data representation items, where the data representation items can represent data items in a data source. In response to the request(s), the items manager can perform acts, which can include generating (420) placeholders corresponding to the data representation items. The acts can also include the items manager returning (430) the placeholders to the client in response to the request(s), as well as requesting (440) and receiving (450) the data items from the data source. Additionally, the acts can include the items manager providing (460) the data representation items to the client, and informing (470) the client that the placeholders are to be replaced with the data representation items. This informing (470) could be done in any of various ways, such as by sending an "items available" instruction, sending a "delete" and corresponding "insert" instruction, or in less explicit ways. For example, the items manager could provide a data representation item (e.g., by including a reference to the item) and a reference to the corresponding placeholder according to a formal protocol or a less formal technique without explicit instructions, but in such a way that the client understands that the placeholder is to be replaced with the corresponding data representation item.

Returning (430) the placeholders to the client can be performed synchronously in response to corresponding request(s) from the client, while receiving (450) the data items from the data source and providing (460) the representation items to the client can be performed asynchronously in response to the corresponding requests from the client.

The placeholders can include user interface elements. Moreover, the acts can include fetching user interface elements corresponding to the data representation items from a renderer. Accordingly, providing (460) the representations items to the client can include providing these user interface elements to the client. The technique of FIG. 4 can further include the client presenting the placeholders using an output device in response to the placeholders being returned to the client. Additionally, the technique can include the client presenting the data representation items in place of the placeholders using the output device in response to the client being informed that the placeholders are to be replaced with the data representation items.

Requesting (440) the data items from the data source can include batching multiple requests from the client together and sending to the data source one request for data items represented by data representation items requested in the multiple requests. Moreover, the request(s) from the client can include multiple requests, and requesting (440) the data items from the data source can include the items manager sending multiple requests to the data source.

The acts of the items manager may further include receiving from the data source one or more additional data items for which data representation(s) are not yet requested by the client; storing one or more cached items in a cache, the cached item(s) being selected from a group consisting of the additional data item(s), one or more data representation items representing the additional data item(s), and combinations thereof; receiving a subsequent request from the client for one of the additional data representation item(s); and using the cached item(s) to return the requested one of the additional data representation item(s) to the client.

The acts of the items manager may further include other acts including the following: receiving from the client one or more additional requests for one or more requested additional data representation items; returning to the client one or more placeholders corresponding to the additional data representation item(s); determining whether the data source includes a data item corresponding to each of the requested additional data representation item(s); and for each of the requested additional data representation item(s) for which the items manager determines that the data source does not include a data item corresponding to that additional data representation item, informing the client that a corresponding placeholder is to be deleted. Moreover, for each requested additional data representation item for which the items manager has no record of a data item in the data source corresponding to that additional data representation item, the items manager can inform the client that a corresponding placeholder is to be treated as a mirage.

Figure 5:
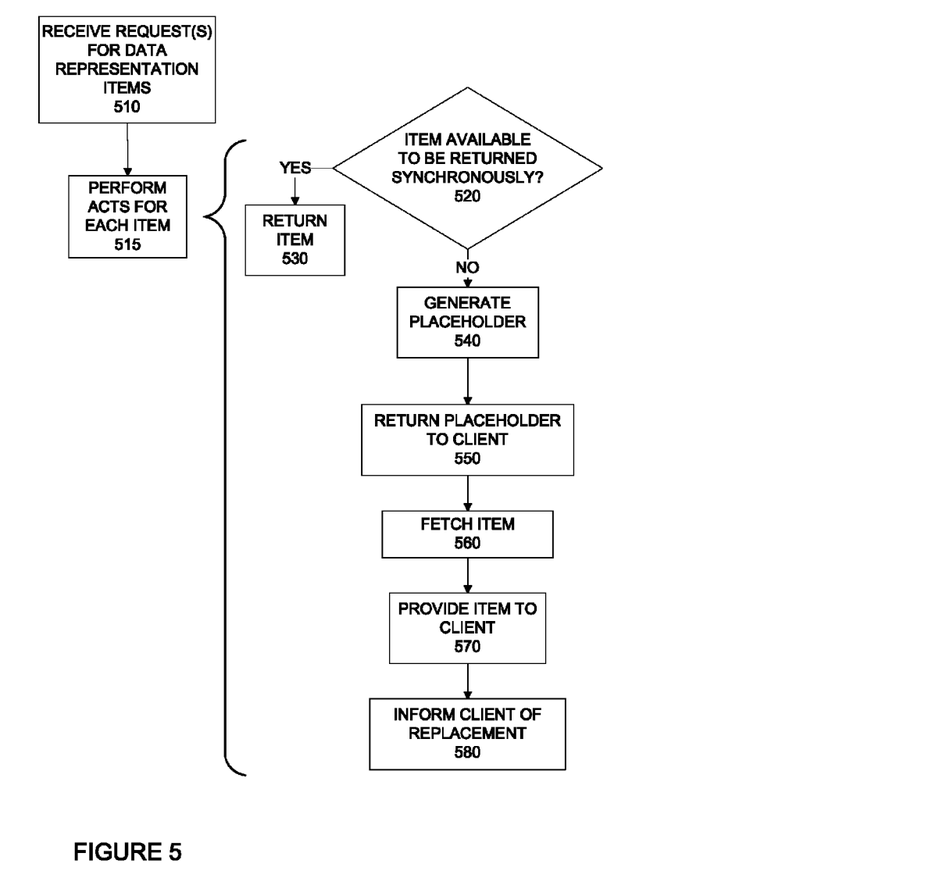
FIG. 5 is a flowchart of another technique for returning placeholders for data representation items.

Referring now to FIG. 5, another technique for returning placeholders for data representation items will be described. The technique can include receiving (510) at an items manager a set of one or more requests from a client for multiple data representation items, where the data representation items represent data items in a data source. The items manager can perform (515) acts for each of the data representation items. Such acts may be performed on groups of data representation items and/or on data representation items individually. The acts can include determining (520) whether the data representation item is available to be synchronously returned to the client in response to the set of one or more requests. This determination (520) may include determining whether the data source can return the data item represented by the data representation item to the items manager synchronously and/or determining whether the data representation item is available to be synchronously returned to the client comprises determining whether the items manager has cached the data representation item. If so, then the acts can include synchronously returning (530) the data representation item to the client. If not, then the acts can include the following: generating (540) a placeholder corresponding to the data representation item; returning (550) the placeholder to the client; fetching (560) a data item represented by the data representation item from the data source; providing (570) the data representation item to the client; and informing (580) the client that the placeholder is to be replaced with the data representation item.

The placeholder can be a rendered placeholder including a placeholder user interface element, and each data representation item provided to the client can be a rendered data representation item including an item user interface element.

The acts performed for each of the data representation items, if the items manager determines that the data representation item is not available to be synchronously returned to the client, can additionally include the following: the client presenting the placeholder using an output device in response to the placeholder being returned to the client; and the client presenting the data representation item in place of the placeholder using the output device in response to the client being informed that the placeholder is to be replaced with the data representation item. Additionally, fetching (560) the data item from the data source can include requesting the data item as part of one request for items represented by data representation items requested in multiple requests from the client.

The technique of FIG. 5 can further include the items manager receiving from the data source one or more additional data items not yet requested by the client. Additional data representation items representing the additional data item(s) can be stored in a cache (such as in the local data representation discussed above) by the items manager. The technique can further include the items manager receiving a subsequent request from the client for one of the additional data representation item(s), and returning the requested one of the additional data representation item(s) from the cache to the client.

The technique can further include the items manager performing the following: receiving from the client one or more additional requests for one or more requested additional data representation items; returning to the client one or more placeholders corresponding to the additional data representation item(s); determining whether the data source includes data items corresponding to each of the requested additional data representation item(s); and for each requested additional data representation item for which the items manager determines that the data source does not include a data item corresponding to that additional data representation item, informing the client that a corresponding placeholder is to be deleted. Moreover, for each requested additional data representation item for which the items manager determines that the data source does not include a data item corresponding to that additional data representation item, the items manager can inform the client that the corresponding placeholder is a mirage.

Figure 6:
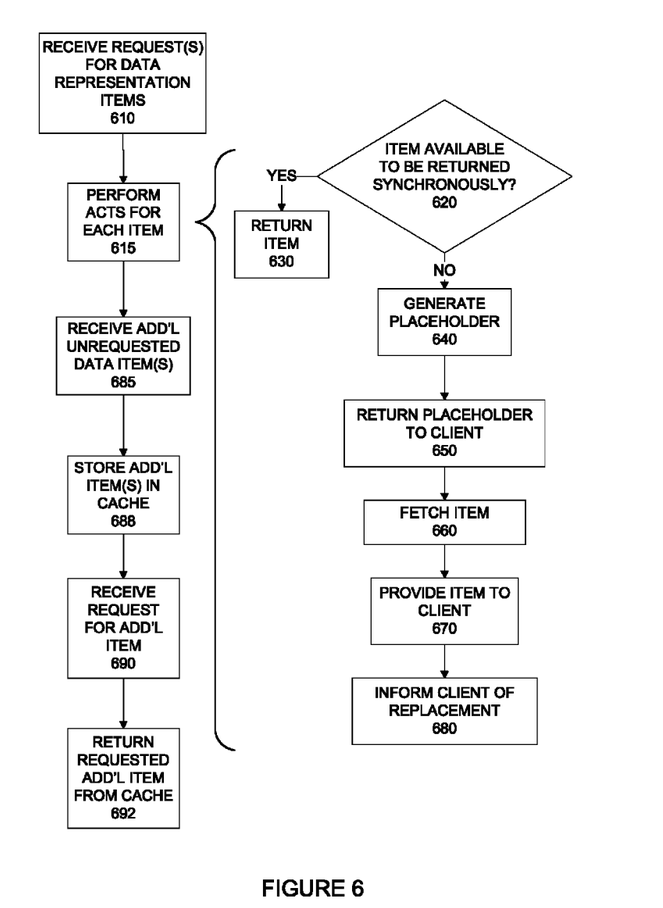
FIG. 6 is a flowchart of yet another technique for returning placeholders for data representation items.

Referring now to FIG. 6, yet another technique for returning placeholders for data representation items will be described. The technique of FIG. 5 can be performed by an items manager that is configured to be used with any of various different clients and to be used with any of various different data sources. The technique can include receiving (610) at the items manager a set of one or more requests from a client for multiple data representation items, where the data representation items can represent data items in a data source. For each of the requested data representation items, the items manager can perform (615) acts. The acts can include determining (620) whether the data representation item is available to be returned synchronously to the client in response to the set of request(s). If so, then the items manager can return (630) the data representation item to the client without sending to the client a placeholder for the data representation item. If the items manager determines (620) that the data representation item is not available to be synchronously returned to the client, then the items manager can perform the following: generating (640) a placeholder corresponding to the data representation item; returning (650) the placeholder to the client; fetching (660) a data item represented by the data representation item from the data source; providing (670) the data representation item to the client; and informing (680) the client that the placeholder is to be replaced with the data representation item. The placeholder can be a rendered placeholder including a placeholder user interface element. Additionally, the data representation item can be provided (670) to the client in the form of a rendered data representation item including an item user interface element.

The items manager can receive (685) one or more additional data items from the client, even though corresponding data representation item(s) have not been requested by the client. The items manager can store (688) additional data representation item(s) representing the additional data item(s) in a cache. The items manager can receive (690) a subsequent request from the client, requesting one of the additional data representation item(s). The requested additional data representation item can be returned (692) from the cache to the client.

The technique of FIG. 6 may also include the items manager receiving from the client addition requests for data representation items. The items manager can return placeholders to the client, where the placeholders correspond to the data representation items requested in the additional requests. The items manager can determine whether the data source includes data items corresponding to each of the data representation items requested in the additional requests. For each data representation item requested in the additional requests for which the items manager determines that the data source does not include a data item corresponding to that data representation item, the client can be informed that a corresponding placeholder is a mirage and is to be deleted.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
 an items manager receiving a set of one or more requests from a client for multiple initial data representation items, the initial data representation items representing initial data items in a data source; and
 in response to the one or more requests, the items manager performing acts comprising:
  generating initial placeholders corresponding to the initial data representation items;
  returning the initial placeholders to the client in response to the one or more requests;
  requesting the initial data items from the data source;
  receiving the initial data items from the data source;
  providing the initial data representation items to the client; and
  informing the client that the initial placeholders are to be replaced with the initial data representation items;
 the items manager receiving from the client one or more additional requests for requested additional data representation items;
 the items manager returning to the client additional placeholders corresponding to the additional data representation items;
 the items manager determining, for each of the requested additional data representation items, that the data source does not include a data item corresponding to the requested additional data representation item;
 for a first set of one or more of the additional data representation items, the items manager determining that the items manager does not have a record of a corresponding data item having existed in the data source and informing the client that a corresponding placeholder is a mirage; and
 for a second set of one or more of the additional data representation items, the items manager determining that the items manager does have a record of a corresponding data item having existed in the data source and informing the client that a corresponding placeholder is not a mirage and is to be deleted.

2. The method of claim 1, wherein returning the initial placeholders to the client is performed synchronously in response to one or more corresponding requests of the set of one or more requests, while receiving the initial data items from the data source and providing the initial data representation items to the client is performed asynchronously in response to the corresponding requests of the set of one or more requests.

3. The method of claim 1, wherein the initial placeholders comprise user interface elements.

4. The method of claim 1, wherein the acts further comprise the items manager fetching user interface elements corresponding to the initial data representation items from a renderer, and wherein providing the representations items to the client comprises providing the user interface elements to the client.

5. The method of claim 1, wherein the method further comprises:

the client presenting the initial placeholders using an output device in response to the initial placeholders being returned to the client; and the client presenting the initial data representation items in place of the initial placeholders using the output device in response to the client being informed that the initial placeholders are to be replaced with the initial data representation items.

6. The method of claim 1, wherein requesting the initial data items from the data source comprises batching multiple requests from the client together and sending to the data source one request for data items represented by data representation items requested in the multiple requests.

7. The method of claim 1, wherein the acts further comprise: receiving from the data source one or more further additional data items represented by one or more further additional data representation items not yet requested by the client;
    storing one or more cached items in a cache, each of the one or more cached items being selected from a group consisting of the one or more further additional data items and one or more further additional data representation items representing the one or more further additional data items;
    receiving a subsequent request from the client for one of the one or more further additional data representation items; and
    using at least one of the one or more cached items to return the requested one of the one or more further additional data representation items to the client.

8. Computer-readable storage hardware having computer-executable instructions embodied thereon that, when executed by at least one processor, cause the at least one processor to perform acts comprising:
    an items manager receiving a set of one or more requests from a client for multiple initial data representation items, the initial data representation items representing initial data items in a data source; and
    in response to the one or more requests, the items manager performing acts comprising:
        generating initial placeholders corresponding to the initial data representation items;
        returning the initial placeholders to the client in response to the one or more requests;
        requesting the initial data items from the data source;
        receiving the initial data items from the data source;
        providing the initial data representation items to the client; and
        informing the client that the initial placeholders are to be replaced with the initial data representation items;
    the items manager receiving from the client one or more additional requests for requested additional data representation items;
    the items manager returning to the client additional placeholders corresponding to the additional data representation items;
    the items manager determining, for each of the requested additional data representation items, that the data source does not include a data item corresponding to the requested additional data representation item;
    for a first set of one or more of the additional data representation items, the items manager determining that the items manager does not have a record of a corresponding data item having existed in the data source and informing the client that a corresponding placeholder is a mirage; and
    for a second set of one or more of the additional data representation items, the items manager determining that the items manager does have a record of a corresponding data item having existed in the data source and informing the client that a corresponding placeholder is not a mirage and is to be deleted.

9. The computer-readable storage hardware of claim 8, wherein the acts further comprise the items manager determining that the initial data representation items are not available to be synchronously returned to the client, and wherein the generating of the initial placeholders corresponding to the initial data representation items and the returning the initial placeholders to the client in response to the one or more requests are performed in response to the items manager determining that the initial data representation items are not available to be synchronously returned to the client.

10. The computer-readable storage hardware of claim 9, wherein determining that the initial data representation items are not available to be synchronously returned to the client comprises determining that the data source will not return the initial data items represented by the initial data representation items to the items manager synchronously.

11. The computer-readable storage hardware of claim 9, wherein determining that the initial data representation items are not available to be synchronously returned to the client comprises determining that the initial data representation items are not in a cache.

12. The computer-readable storage hardware of claim 8, wherein the initial placeholders corresponding to the initial data representation items are rendered placeholders comprising placeholder user interfaces, and wherein the initial data representation items provided to the client are rendered data representation items comprising item user interface elements.

13. The computer-readable storage hardware of claim 8, wherein the acts further comprise:
    the client presenting the initial placeholders using an output device in response to the initial placeholders being returned to the client; and
    the client presenting the initial data representation items in place of the initial placeholders using the output device in response to the client being informed that the initial placeholders are to be replaced with the initial data representation items.

14. The computer-readable storage hardware of claim 13, wherein the acts further comprise the items manager performing the following:
    receiving from the data source one or more data items represented by one or more further additional data representation items not yet requested by the client;
    storing the one or more further additional data representation items not yet requested by the client in a cache;
    receiving a subsequent request from the client for one of the one or more further additional data representation items; and
        returning the requested one of the one or more further additional data representation items from the cache to the client.

15. A computer system comprising:
    at least one processor; and
    memory comprising instructions stored thereon that when executed by at least one processor cause at least one processor to perform acts comprising:
    an items manager receiving a set of one or more requests from a client for multiple initial data representation items, the initial data representation items representing initial data items in a data source; and
    in response to the one or more requests, the items manager performing acts comprising:

generating initial placeholders corresponding to the initial data representation items;
returning the initial placeholders to the client in response to the one or more requests;
requesting the initial data items from the data source;
receiving the initial data items from the data source;
providing the initial data representation items to the client; and
informing the client that the initial placeholders are to be replaced with the initial data representation items;
the items manager receiving from the client one or more additional requests for requested additional data representation items;
the items manager returning to the client additional placeholders corresponding to the additional data representation items;
the items manager determining, for each of the requested additional data representation items, that the data source does not include a data item corresponding to the requested additional data representation item;
for a first set of one or more of the additional data representation items, the items manager determining that the items manager does not have a record of a corresponding data item having existed in the data source and informing the client that a corresponding placeholder is a mirage; and
for a second set of one or more of the additional data representation items, the items manager determining that the items manager does have a record of a corresponding data item having existed in the data source and informing the client that a corresponding placeholder is not a mirage and is to be deleted.

16. The computer system of claim 15, wherein returning the initial placeholders to the client is performed synchronously in response to one or more corresponding requests of the set of one or more requests, while receiving the initial data items from the data source and providing the initial data representation items to the client is performed asynchronously in response to the corresponding requests of the set of one or more requests.

17. The computer system of claim 15, wherein the initial placeholders comprise user interface elements.

18. The computer system of claim 15, wherein the acts performed by the items manager further comprise the items manager fetching user interface elements corresponding to the initial data representation items from a renderer, and wherein providing the representations items to the client comprises providing the user interface elements to the client.

19. The computer system of claim 15, wherein the acts performed by the at least one processor further comprise:
the client presenting the initial placeholders using an output device in response to the initial placeholders being returned to the client; and
the client presenting the initial data representation items in place of the initial placeholders using the output device in response to the client being informed that the initial placeholders are to be replaced with the initial data representation items.

20. The computer system of claim 15, wherein requesting the initial data items from the data source comprises batching multiple requests from the client together and sending to the data source one request for data items represented by data representation items requested in the multiple requests.

* * * * *